March 9, 1926.
W. L. GOODNIGHT
SHOVEL ATTACHING DEVICE
Filed June 1, 1925
1,576,425
3 Sheets-Sheet 1
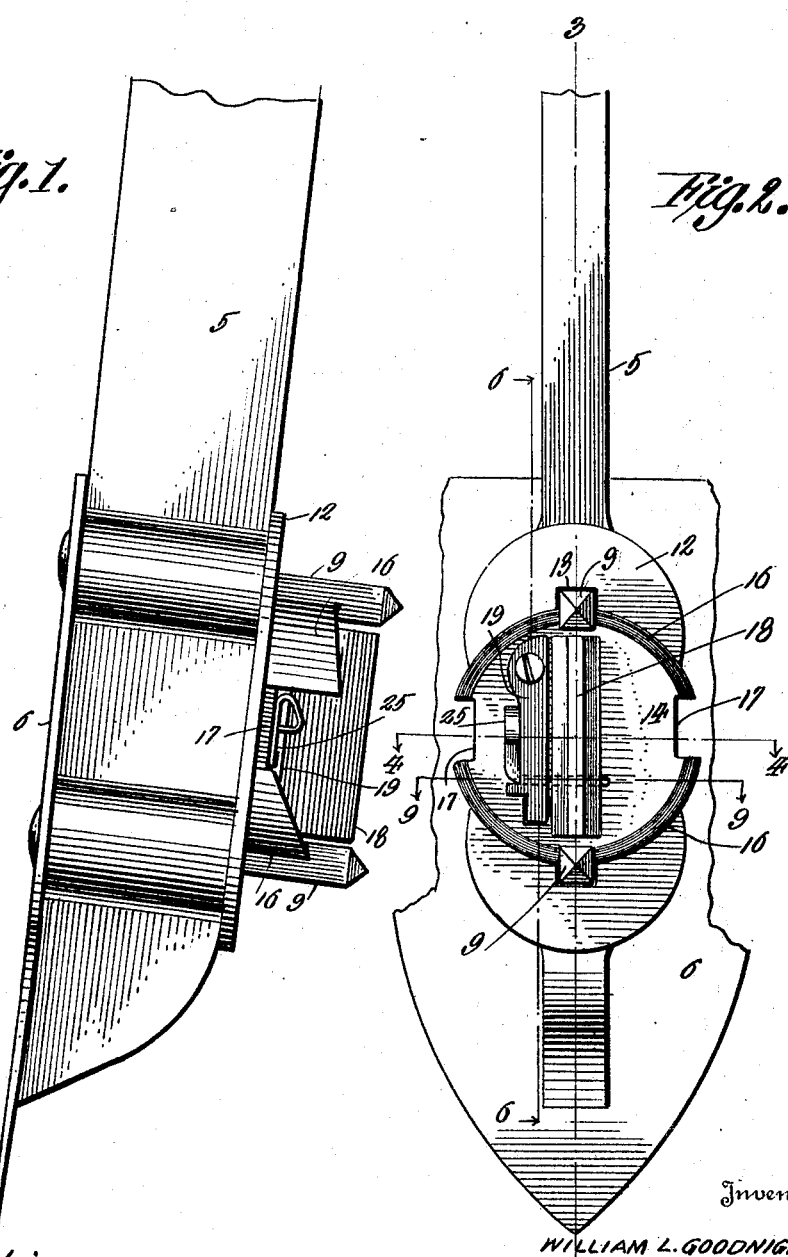
Inventor
WILLIAM L. GOODNIGHT March 9, 1926.
W. L. GOODNIGHT
1,576,425
SHOVEL ATTACHING DEVICE
Filed June 1, 1925   3 Sheets-Sheet 2
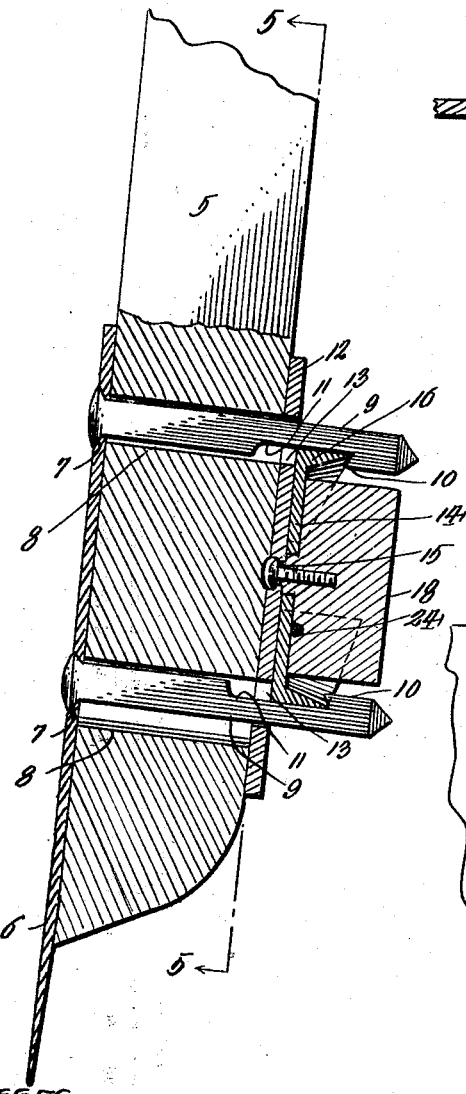
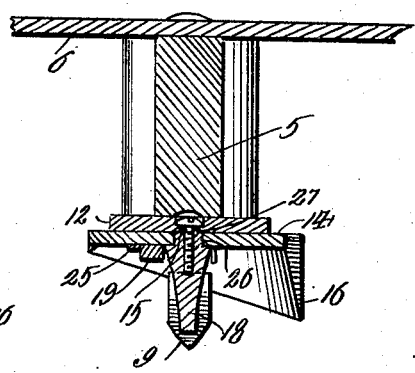
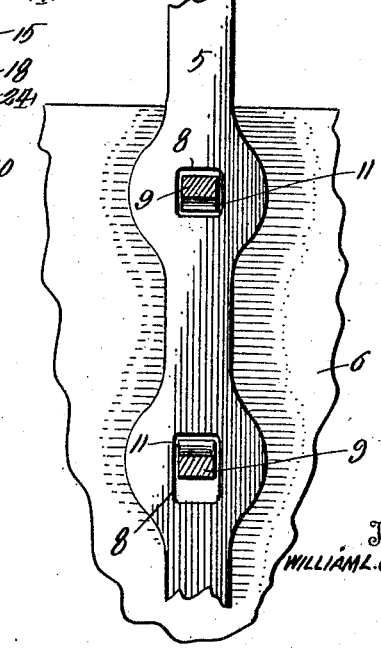
Inventor
WILLIAM L. GOODNIGHT March 9, 1926.  1,576,425
W. L. GOODNIGHT
SHOVEL ATTACHING DEVICE
Filed June 1, 1925   3 Sheets-Sheet 3
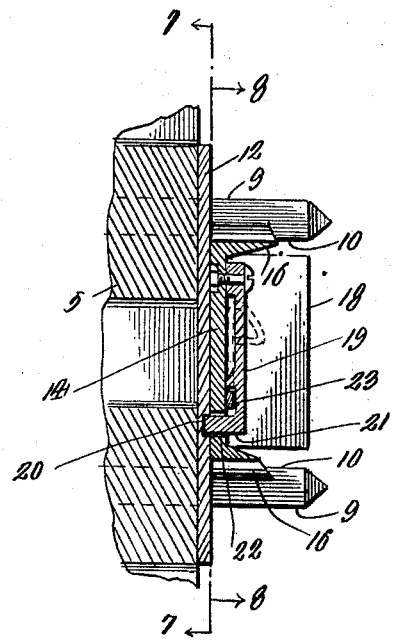
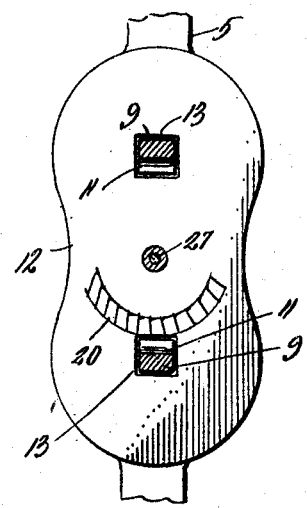
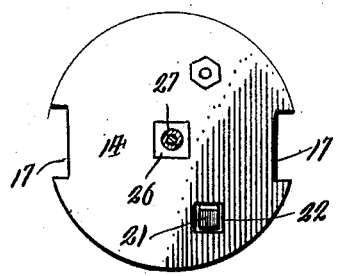
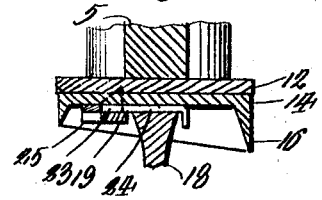
WITNESSES
Inventor
WILLIAM L. GOODNIGHT
By
Attorney Patented Mar. 9, 1926.

1,576,425

UNITED STATES PATENT OFFICE.

WILLIAM L. GOODNIGHT, OF SMALLETT, MISSOURI.

SHOVEL-ATTACHING DEVICE.

Application filed June 1, 1925. Serial No. 34,200.

*To all whom it may concern:*

Be it known that I, WILLIAM L. GOODNIGHT, a citizen of the United States, residing at Smallett, in the county of Douglas and State of Missouri, have invented certain new and useful Improvements in Shovel-Attaching Devices, of which the following is a specification.

This invention relates to certain new and useful improvements in shovel attaching devices for plows, cultivators and like agricultural implements.

The primary object of the invention is to provide improved means for securely attaching shovels and like earth working blades of agricultural implements to their supporting standards; and by means of which attachment or detachment of the shovels may be more expeditiously effected without the need of special skill or the use of tools, such as wrenches or the like.

Another object is to provide an attaching device of the above kind which is extremely simple and durable in construction and adapted to be manufactured at a relatively low cost.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views;

Figure 1 is a side elevational view showing a plow shovel secured to its supporting standard by means of an attaching device constructed in accordance with the present invention, Figure 2 is a rear elevational view of the device shown in Figure 1, partly broken away, Figure 3 is a sectional view taken substantially upon line 3—3 of Figure 2, Figure 4 is a view taken substantially upon line 4—4 of Figure 2, Figure 5 is a sectional view taken substantially upon line 5—5 of Figure 3, Figure 6 is a sectional view taken substantially upon line 6—6 of Figure 2, Figure 7 is a sectional view taken substantially upon line 7—7 of Figure 6, Figure 8 is a sectional view taken substantially upon line 8—8 of Figure 6 with parts omitted, and Figure 9 is a sectional view taken substantially upon line 9—9 of Figure 2.

Referring more in detail to the drawings, 5 indicates the depending supporting standard or shank of a plow or the like and 6 indicates the earth working blade or shovel which is secured against the forward surface of the lower end of said standard, the shovel and standard having the usual pairs of spaced superimposed openings 7 and 8 respectively in which threaded bolts are ordinarily disposed, nuts being usually threaded on such bolts against the rear surface of the standard for securing the shovel in place. This conventional manner of attaching the shovel is objectionable for numerous reasons, such as the need of consuming much time in applying or removing the nuts to effect attachment or removal of the shovel, especially when the nuts become rusted on the bolts, and the need of a wrench for effecting turning of the nuts to apply or remove them.

In accordance with the present invention, threadless bolts 9 are disposed through the openings 7 and 8 and these bolts have hook-shaped projecting rear ends as at 10 preferably formed by notching the shanks of the bolts as at 11. A plate 12 is disposed against the rear surface of the standard 5 and has a pair of openings 13 through which the bolts 9 project, whereby turning of the plate is prevented. A second circular plate 14 is rotatably secured to the washer plate 12 as at 15 so as to be disposed between the bolts 9 when the plate 12 is in position, and the rotary plate 14 has opposed rearwardly projecting arcuate marginal cam flanges 16 whose ends terminate in spaced relation at the sides of the opposed notches 17 formed in the edge of the plate 14. The flanges 16 are disposed so that their cam edges engage the inner sides of the hookshaped ends of bolts 9 when the plate 14 is rotated, whereby the bolts 9 are drawn rearwardly through the parts 5, 6 and 12 for forcing the shovel 6 tightly against the standard 5 and rigidly securing said shovel in place while forcing the plate 12 tightly against the standard 5. The plate 14 is initially disposed with the notches 17 coincident with the openings 13 for permitting the plate 12 to be slid on to the bolts 9 until disposed against the standard 5, whereupon the plate 14 is turned as above set forth. A reversal of this operation is had for effecting removal of the shovel, and it is apparent that either operation can be accomplished quickly without tools.

A finger piece or bar 18 is centrally secured to the plate 14 for facilitating manual rotation of the latter, and a resilient catch 19 is secured to the plate 14 and adapted to engage ratchet teeth 20 on the rear face of the plate 12 for preventing accidental backward turning of the plate 14 after the latter has been turned for tightly securing the shovel in place. In other words, the tightening of the bolts 9 is effected by turning of the plate 14 in one direction, and the catch and teeth permit such turning of plate 14 but prevent accidental turning of the latter in the opposite direction. As shown clearly in Figure 6, the catch 19 is provided with a pawl 21 at its free end which projects forwardly through an opening 22 in the plate 14 to engage the teeth 20 and the latter are concentric with the pivot of plate 14 as shown in Figure 7.

A cam 23 is disposed between the free end portion of the catch 19 and the plate 14 and is journaled as at 24 between the finger piece 18 and the plate 14. A lever 25 is rigid with and extended at right angles from one end of the cam 23 for facilitating manual turning of the latter. This lever 25 normally lies against the plate 14 when the cam 23 is disposed to allow the catch to assume its normal position engaging the teeth 20 but when the lever 25 is swung outwardly or rearwardly, the cam 23 flexes the catch rearwardly so that the pawl 21 is released from the teeth 20 when it is desired to rotate the plate 14 backwardly for release of the bolts 9.

The finger piece 18 may have a central polygonal projection 26 fitting in a similar opening of plate 14 as shown in Figure 8 whereby turning of the finger piece relative to plate 14 is prevented, and the projection 26 may have a cylindrical extension 27 fitting in a circular opening in the plate 12 for permitting turning of parts 14 and 18 relative to plate 12. The plate 14 may be held to plate 12 in any suitable manner such as by means of the screw shown.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:

1. A device for attaching an earth working blade of an agricultural implement to the forward surface of its supporting standard wherein the blade and standard have pairs of registerable superimposed bolt-receiving openings, including a pair of threadless bolts adapted to be disposed in said openings and having hook-shaped ends, a washer plate having a pair of openings for reception of said bolts and adapted to be disposed against the rear surface of said standard, and a cam element rotatably carried by the washer plate and engageable with the hook shaped ends of the bolts for drawing the latter through the blade, standard and washer plate so as to force the blade and washer plate tightly against the respective surfaces of the standard when said cam element is turned in one direction.

2. A device for attaching an earth working blade of an agricultural implement to the forward surface of its supporting standard wherein the blade and standard have pairs of registerable superimposed bolt-receiving openings, including a pair of threadless bolts adapted to be disposed in said openings and having hook-shaped ends, a washer plate having a pair of openings for reception of said bolts and adapted to be disposed against the rear surface of said standard, and a cam element rotatably carried by the washer plate and engageable with the hook shaped ends of the bolts for drawing the latter through the blade, standard and washer plate so as to force the blade and washer plate tightly against the respective surfaces of the standard when said cam element is turned in one direction, and manually releasable means to prevent accidental turning of said cam element in the other direction.

3. A device for attaching an earth working blade of an agricultural implement to the forward surface of its supporting standard wherein the blade and standard have pairs of registerable superimposed bolt-receiving openings, including a pair of threadless bolts adapted to be disposed in said openings and having hook-shaped ends, a washer plate having a pair of openings for reception of said bolts and adapted to be disposed against the rear surface of said standard, and a cam element rotatably carried by the washer plate and engageable with the hook shaped ends of the bolts for drawing the latter through the blade, standard and washer plate so as to force the blade and washer plate tightly against the respective surfaces of the standard when said cam element is turned in one direction, said cam element embodying a plate having opposed marginal notches and provided with rearwardly projecting arcuate cam flanges whose ends terminate in spaced relation at the sides of said notches.

4. A device for attaching an earth working blade of an agricultural implement to the forward surface of its supporting standard wherein the blade and standard have pairs of registerable superimposed bolt-receiving openings, including a pair of threadless bolts adapted to be disposed in said openings and having hook-shaped ends, a washer plate having a pair of openings for reception of said bolts and adapted to be disposed against the rear surface of said standard, and a cam element rotatably carried by the washer plate and engageable with the hook shaped ends of the bolts for drawing the latter through the blade, standard and washer plate so as to force the blade and washer plate tightly against the respective surfaces of the standard when said cam element is turned in one direction, said last named means including ratchet teeth on the washer plate and a catch carried by the cam element having a pawl normally adapted to engage said ratchet teeth.

5. A device for attaching an earth working blade of an agricultural implement to the forward surface of its supporting standard wherein the blade and standard have pairs of registerable superimposed bolt-receiving openings, including a pair of threadless bolts adapted to be disposed in said openings and having hook-shaped ends, a washer plate having a pair of openings for reception of said bolts and adapted to be disposed against the rear surface of said standard, and a cam element rotatably carried by the washer plate and engageable with the hook shaped ends of the bolts for drawing the latter through the blade, standard and washer plate so as to force the blade and washer plate tightly against the respective surfaces of the standard when said cam element is turned in one direction, said last named means including ratchet teeth on the washer plate and a catch carried by the cam element having a pawl normally adapted to engage said ratchet teeth, said cam element having an opening through which said pawl projects.

6. A device for attaching an earth working blade of an agricultural implement to the forward surface of its supporting standard wherein the blade and standard have pairs of registerable superimposed bolt-receiving openings, including a pair of threadless bolts adapted to be disposed in said openings and having hook-shaped ends, a washer plate having a pair of openings for reception of said bolts and adapted to be disposed against the rear surface of said standard, and a cam element rotatably carried by the washer plate and engageable with the hook shaped ends of the bolts for drawing the latter through the blade, standard and washer plate so as to force the blade and washer plate tightly against the respective surfaces of the standard when said cam element is turned in one direction, said last named means including ratchet teeth on the washer plate and a catch carried by the cam element having a pawl normally adapted to engage said ratchet teeth, and a lever provided with a cam for releasing said catch.

In testimony whereof I affix my signature.

WILLIAM L. GOODNIGHT.